June 10, 1941.  E. F. W. ALEXANDERSON  2,245,246
NAVIGATION AND LANDING OF AIRCRAFT IN FOG
Filed Aug. 24, 1938  4 Sheets-Sheet 1

Inventor:
Ernst F. W. Alexanderson,
by Harry E. Dunham
His Attorney.

June 10, 1941.  E. F. W. ALEXANDERSON  2,245,246

NAVIGATION AND LANDING OF AIRCRAFT IN FOG

Filed Aug. 24, 1938  4 Sheets-Sheet 3

Inventor:
Ernst F. W. Alexanderson,
by Harry E. Dunham
His Attorney.

Patented June 10, 1941

2,245,246

UNITED STATES PATENT OFFICE 2,245,246

NAVIGATION AND LANDING OF AIRCRAFT IN FOG

Ernst F. W. Alexanderson, Schenectady, N. Y., assignor to General Electric Company, a corporation of New York Application August 24, 1938, Serial No. 226,594

19 Claims. (Cl. 250—11)

My invention relates to radio systems for guiding aircraft in fog or under other conditions of low visibility, and particularly to radio systems for guiding the aircraft in fog over a predetermined course or trail in cross-country flying and for landing the aircraft in fog at landing fields provided at intervals along the course. The invention has for its principal object to provide improved means for guiding an aircraft over an extended cross-country radio trail and for guiding the aircraft along predetermined glide paths to the landing fields.

In providing a system for guiding an aviator who is navigating in fog it is necessary that he be given at all times accurate information where he is and at what altitude above ground. From a practical point of view it is also important that the information be given him by a single simple radio apparatus on the aircraft and be given in such form that he can make use of it through a natural and instinctive mental reaction without need of interpretation and calculation. When flying in fog across country on the radio trail and between the landing stations, the aviator requires information obtained from course signal means which will enable him to follow the trail, and information obtained from altitude signal means which will enable him to fly at a predetermined altitude with reference to ground. The radio trail or course on which the aviator flies across country should terminate, at predetermined points along the trail, in radio systems for landing the aircraft. The requirements for a successful landing system are that a glide path should be established leading into the landing field from the trail, and that the aviator should have direct and preferably visual indication whether he is to the right or left of this glide path and whether he is above or below it.

In accordance with the present invention a novel, improved, and efficient system for guiding an aircraft over an extended cross-country radio trail or course in fog and for landing the aircraft in fog is provided.

The system comprises a series of trail transmitter stations spaced at relatively wide intervals along the predetermined cross-country flying course or trail and arranged to transmit course radio signals and altitude radio signals, and similar transmitter stations, but spaced at relatively short intervals, located at the landing fields and arranged to transmit course signals and altitude signals along the predetermined glide paths leading to the landing fields from the cross-country course or trail.

The course signal antennas at each station both along the cross country trail and at the glide paths are preferably so arranged as to provide at each station two beams directed horizontally with vertical polarization, the beams being directed respectively a predetermined number of degrees to the right and left of the course. A dot-dash method of keying the course signal antennas is preferably employed.

The altitude signal is radiated at each station by two antennas spaced apart in the direction of the course and each providing a radiation directed upwards with a sharp directivity in the direction of the course but spreading fan-shape along the course. The two altitude beams at each station create an interference pattern in space so that the signal periodically disappears when the plane flies through the pattern.

The system in accordance with my present invention provides, on the aircraft, a course and altitude signal receiving means which preferably comprises a single receiver apparatus. For the course signal indication the receiver apparatus preferably includes a visual course indicator of the dot-dash type, wherein the instrument needle goes to the right or to the left if the aircraft is off course but remains on neutral when the aircraft is on course. For the altitude signal indication the receiver apparatus includes means, preferably providing a visual indication, responsive to the pulses created in the radio receiver by the interference pattern which is set up by the altitude signal transmitter. The altitude indicating means is so arranged that in flying the aircraft through an interference pattern of a given form, for a predetermined ground speed the instrument indicates directly in response to the pulsation frequency whether the aircraft was at the correct altitude as it passed through this interference pattern.

The time of flying through the interference patterns is so short particularly at relatively low altitudes that indication of aircraft altitude based on direct observation of the pulsation frequency is not usually feasible. An altitude indicating means is, therefore, provided which registers each pulsation separately and integrates or sums up the effect of the whole number of pulsations so that the pilot obtains the final result when he has passed through the pattern. The indicating instrument associated with this integrating means is so arranged that at the end of the passage of the aircraft through an interference pattern, the pointer comes to rest at a point, on the dial, indicating altitude and remains at this point until the instrument is reset to the off point by the operator, ready for altitude indication at the next succeeding interference pattern.

Along the sections of the radio trail or cross-country course, between the landing fields, the altitude signal transmitters are preferably so arranged that the interference patterns are alike throughout the sections.

At the glide path leading to a landing field the several altitude signal transmitters may be so arranged that the interference patterns are all different. The several interference patterns may be, for example, so adjusted and the several beacons or stations may be so spaced along the glide path that at the predetermined gradually decreasing speeds of the aircraft as it comes down the glide path toward the ground, the successive maxima of radiation, in the succession interference patterns along the glide path are passed by the aircraft at constant intervals of time and the frequency of the pulses received on the aircraft and due to the passing of the aircraft successively through the patterns is, therefore, the same at all of the patterns. In this case the pointer of the altitude indicating instrument on the aircraft comes opposite a certain point on the dial, for example the middle point, if the plane passes the first landing beacon at a predetermined glide path altitude and at the correct predetermined speed at that beacon. The pointer then comes to this same predetermined point for the successively lower altitudes at the succeeding beacons if the plane passes at the predetermined altitudes and speeds for these beacons.

The several altitude signal transmitters at a glide path may, however, be so arranged that the interference patterns are all alike, similarly, for example, to the interference patterns along the cross-country radio trail sections. In this case, unless the ratio between the predetermined desired speeds along the glide path throughout the series of stations is inversely as the ratio between the desired glide path altitudes throughout the series of stations, the pulsation frequency received by the aircraft will not remain the same, as the aircraft passes the series of stations. In practice, the speeds and altitudes will usually be such as the aircraft passes the stations that the pulsation frequency will be least at the first station and will progressively increase to the last station. In this latter case, since the received pulsation frequency is changing throughout the passage of the aircraft down the glide path, adjustment of the indicating instrument will be required at each succeeding station of the glide path to compensate for the increasing frequency, if it is desired that the pointer come to the same point on the dial to indicate the correct glide path altitude of the aircraft for each station on the glide path.

Instead of indicating the correct glide path altitude at each station by merely bringing the pointer to the one point on the dial as above mentioned, the indicating instrument may be arranged to show, on a single scale, the actual altitude of the aircraft above ground in meters or feet at each succeeding station along the glide path, adjustment of the instrument being required as before at each succeeding station to compensate for the increasing frequency. If, however, it is desired to avoid the necessity of adjusting the instrument, as the aircraft passes the succeeding stations, to compensate for the increasing frequency, the instrument may be provided with a multiple scale, each scale showing directly and without further adjustment of the instrument a range of altitudes for each glide path station, provided that the speed in passing a station is the aircraft speed desired for the portion of the glide path at that station.

Since in any case the correct indication of aircraft altitude at the successive stations along the radio trail is dependent upon the speed of the aircraft as it passes the stations, and at the glide paths is dependent upon the gradually decreasing speeds at which the aircraft passes through the succeeding interference patterns, a means is provided to adjust the altitude indicating instrument to compensate for speed variation from the predetermined rates of speed at the various stations.

The novel features which are considered to be characteristic of my invention are set forth with particularity in the appended claims. The invention itself, however, both as to its organization and method of operation together with further objects and advantages thereof may best be understood by reference to the following description taken in connection with the accompanying drawings, wherein

Figure 1:
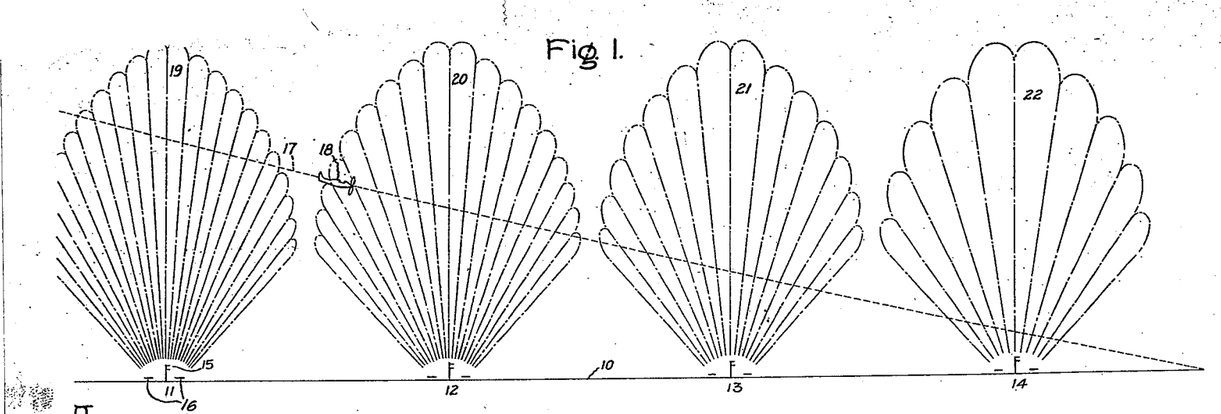
Fig. 1 is a side elevational diagrammatic view showing a series of course and altitude radio stations for guiding an aircraft in fog, and illustrating diagrammatically interference patterns produced by the altitude signal transmitters.

In Fig. 1 the numeral 10 designates ground level, and the numerals 11, 12, 13 and 14 designate respectively course and signal transmitting stations each including a course signal transmitting antenna unit 15 and a pair of altitude signal transmitting antennas 16. The numeral 17 indicates the predetermined glide path down which it is desired that an aircraft 18 pass in making a landing. The glide path is a continuation of a cross-country aircraft course or aircraft radio trail (not shown) over which the aircraft is guided in fog by the signals from a series of course and altitude signal transmitting stations (not shown) similar in general to stations 11 to 14 but spaced at relatively long intervals. The frequency of the course and altitude signals is preferably the same throughout all of the beacons or stations.

The radiation from the pairs of altitude signal transmitting antennas 16 is highly directive in the course direction, and the two antennas of each pair are so arranged and so spaced in the course direction, that the two radiated beams produce a predetermined interference pattern directed upwardly over an angle preferably of the order of 60 degrees. Numerals 19, 20, 21 and 22 designate respectively interference patterns which may be produced by stations 11, 12, 13 and 14.

Figure 2:
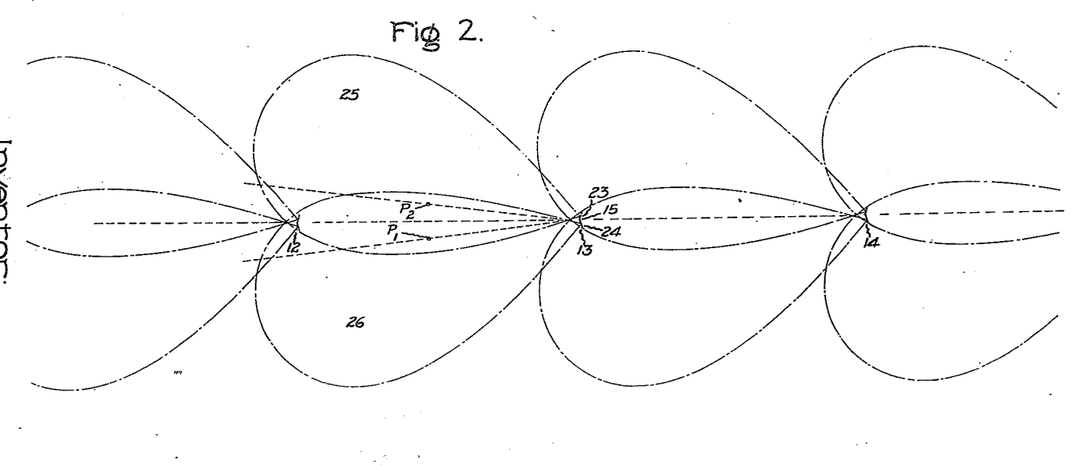
Fig. 2 is a plan view of the series of course and altitude signal stations illustrated in Fig. 1 but showing the diagrammatically the course signal radiation patterns produced by the course signal transmitters.

In Fig. 2 the numerals 23 and 24 designate pairs of antennas constituting the course signal transmitting antenna units 15 which are arranged to radiate pairs of beams 25 and 26 directed horizontally with vertical polarization. The antennas 23 and 24 are preferably so arranged that the beams 25 and 26 are radiated respectively to the right and left of the course by such an amount that when the aviator is flying to one side of the course he will be within the beams of both antennas of the unit but the signal from the beam on the side where he is flying will still be of sufficiently greater strength than the signal from the beam on the other side to insure an adequate off-course indication to the aviator, by the dot-dash or other method. Preferably the angular arrangement of the antennas 23 and 24 should be such that one of the beams 25 is directed 17 degrees to the right of the course and the other beam 26, is directed 17 degrees to the left of the course.

Figures 3, 4:
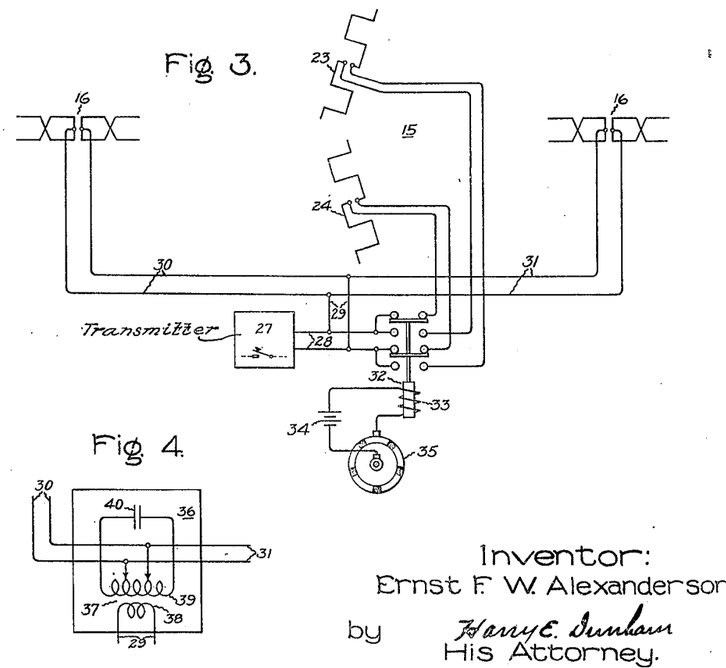
Fig. 3 is a circuit diagram of a course and altitude signal transmitting apparatus.
Fig. 4 illustrates a coupling means to prevent interaction between the course signal and altitude signal circuits of Fig. 3.

In Fig. 3, the course and altitude signal transmitting apparatus comprises a radio transmitter 27 for producing oscillations of suitable power and frequency. The output circuit 28 of transmitter 27 may be connected directly to the two altitude signal antennas 16 through leads 29, 30 and 31. Each altitude signal antenna 16 is preferably of the panel type, provided with a reflector (not shown) in order that the radiation from these antennas may be uni-directional. The conductors of the panel are in the direction of the aircraft course or trail and each panel consists of a suitable number of half-wave radiator units and the same number of reflector units.

The radiation from the course signal antenna unit 15 is controlled by means of a relay apparatus comprising a relay 32 through the contacts of which the output circuit 28 is adapted to be connected to the antenna 23 and 24. The contacts of relay 32 are actuated by an operating coil 33 energized from a current source 34 controlled by a commutator 35. The commutator 35 and relay 33 are so arranged that the antenna unit 15 adapted to be keyed by the dot-dash method, antenna 23 radiating dots and antenna 24 radiating dashes when the commutator 35 is rotated and oscillations are supplied to the antenna unit from transmitter 27.

The antennas 23 and 24 of the course signal antenna unit 15 are preferably of a simple zigzag type which gives the desired radiation for the course signal. In Fig. 3 the antennas 23 and 24 are shown rotated 90 degrees from their true position with reference to the ground.

Figure 5:
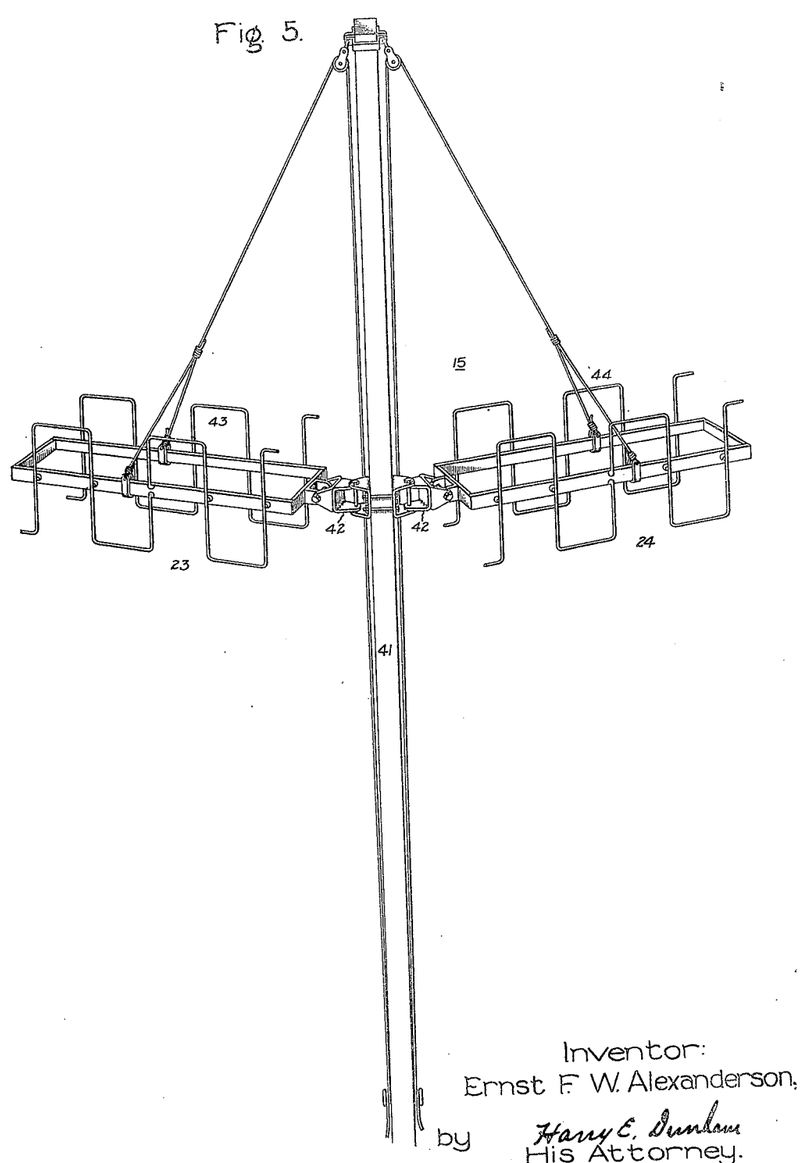
Fig. 5 shows in detail the course signal transmitting antenna units of Fig. 3.

It is preferable to connect the transmitter 27 the antennas 16 through the coupling means illustrated in Fig. 4 in order to prevent interaction between the course signal and altitude signal transmitting systems. This coupling means comprises a transformer 37 having a primary 38 connected to the transmitter and a secondary 39 adjustably connected to the leads 30 and 31, and capacitance 40 connected across the secondary. Antennas 23 and 24 are better shown in Fig. 5 wherein the unit 15 is illustrated as mounted adjustably on a mast 41 by links or hinges 42 permitting the swinging of the antennas 23 and 24 both in the vertical and horizontal direction with reference to the mast. To provide uni-directional radiation of the course signals, the antennas 23 and 24 are provided respectively with reflectors 43 and 44. In order that the course signal radiation may be of the hereinbefore described desired pattern the two antennas 23 and 24 are respectively oriented horizontally on the opposite sides of the course, approximately 17 degrees to a line perpendicular to the course direction.

Figure 6:
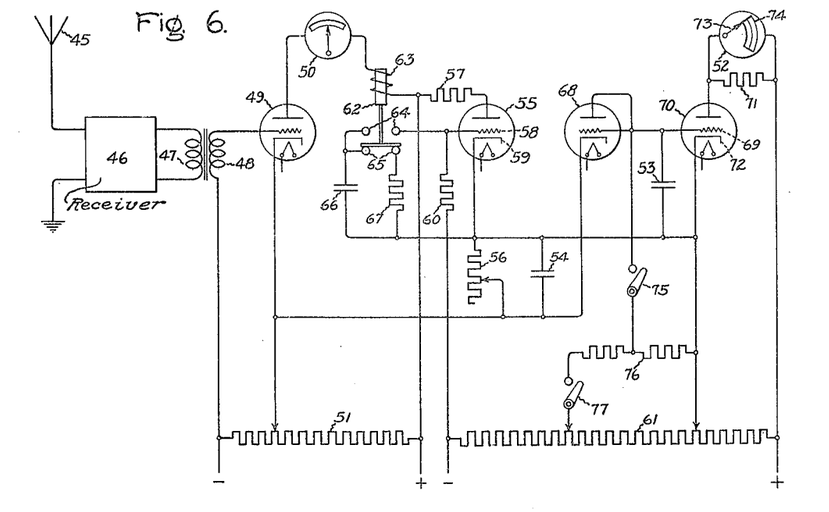
Fig. 6 is a circuit diagram of a course and altitude signal receiving apparatus.

In Fig. 6 the course and altitude receiving apparatus is shown. This equipment comprises an antenna 45 of any suitable type but which is preferably of the loop type oriented in the length direction of the aircraft so that the antenna receives the course signal when the aircraft is approaching one of the trail or landing beacons or stations or is flying between these stations, and also can receive the altitude signals coming from below when the aircraft is passing over the stations. The receiving apparatus further comprises a radio receiver 46, of any well known or preferred type, for amplifying and detecting the dot-dash-modulated waves from the course signal transmitters, and for amplifying the periodically fluctuating waves from the altitude signal transmitters. The output circuit 47 is coupled to the input circuit 48 of an amplifier 49 the output circuit of which includes in series a visual course indicator 50 of the dot-dash type which responds to dot-dash course signals in a manner to be described hereinafter. Anode potential for the amplifier 49 is supplied from a potentiometer 51 connected across a direct current source.

To provide visual indication of altitude, the receiving apparatus comprises an altitude instrument 52 which is adapted to be actuated, at each passing of the aircraft through an interference pattern, in accordance with the amount of charge in a condenser 53. This condenser registers the peak charge on a condenser 54 which in turn is charged in accordance with the pulsation frequency of the altitude signal as the aircraft passes through an interference pattern. For this purpose the receiving apparatus comprises a discharge device or tube 55, having an output circuit including the above mentioned condenser 54 and a leak resistor 56 in parallel therewith, potentiometer 51, and an anode resistor 57, and having a control electrode 58 normally biased negatively by connection of the control electrode 58 and the cathode 59, through a resistor 60, across a portion of a potentiometer 61 connected across a direct current source.

To impress charges on condenser 54 in accordance with the frequency of the pulsations due to passing of the aircraft through an interference pattern, a relay 62 is provided having its actuating winding 63 connected in series in the anode circuit of amplifier tube 49. The relay 62 has two sets of contacts 64 and 65. When the contacts 64 are closed, by energizing of the coil 63 due to the reception by antenna 45 of a strong current pulse due to the transmitted altitude signal, control electrode 58 is short circuited momentarily to cathode 59 by a condenser 66 connected between this cathode and the contacts 64. The potential on control electrode 58 then rises to a value approaching the cathode potential. When the contacts 65 are in closed position, as illustrated, due to the passing of the antenna 45 through a zero voltage section of the interference pattern, control electrode 58 is disconnected from condenser 66, and this latter condenser is connected across a discharge resistor 67 and discharged therethrough. At the instant that the control electrode 58 loses its negative bias, the tube 55 becomes conducting momentarily and a pulse of charging current passes into condenser 54.

For a predetermined ground speed of the aircraft and for an interference pattern such that the altitude signal received by antenna 45 passes through zero a predetermined number of times, for example twenty-five, in passing through the pattern, the peak charge on condenser 54 depends on the number of pulses of charging current per unit of time, since the charge in condenser 54 leaks off continually through resistor 56. The interference patterns being fan-shaped in the direction of flight, the average rate of the pulses of charging current, for a predetermined speed of the aircraft through an interference pattern, therefore varies inversely as the altitude of the aircraft above ground and the peak voltage attained in condenser 54 also varies inversely as this altitude.

Condenser 53 is connected in parallel with condenser 54 through a rectifier 68. During the period that condenser 54 is charging up to its peak voltage as above described, condenser 53 charges to a voltage equivalent to this peak voltage. As the plane passes beyond the given interference pattern and the charging period of condenser 54 consequently ends, the charge on condenser 54 leaks off completely through resistor 56, but the charge on condenser 53 remains since it cannot leak off through rectifier 68. A negative bias due to this charge on condenser 53 is impressed on the control electrode 69 of a space discharge device or tube 70 in the output circuit of which the altitude instrument 52 is connected, in parallel with a resistor 71. Anode potential for tube 70 is provided from the potentiometer 61. When condenser 53 is in the discharged condition and therefore the potential of control electrode 69 is that of the cathode 72 of tube 70, the impedance of tube 70, which is in series with instrument 52 and resistor 71 in parallel, is low. Therefore, the current in the output circuit of tube 70 including resistor 71, is a maximum. Correspondingly, the voltage drop across resistor 71, and therefore the voltage on instrument 52, is a maximum.

The altitude indicating instrument 52 is preferably so arranged that under the above described condition of high voltage on instrument 52 due to the discharged condition of condenser 53, the pointer 73 of the instrument is at the upper end of the scale 74, as illustrated. When, however, the potential of control electrode 69 is made negative due to a charge on condenser 53, the impedance of tube 70 increases, the current in resistor 71 decreases, and the voltage drop through resistor 71 and the voltage on instrument 52 correspondingly decrease. The pointer 73 then comes down to a lower point on scale 74 corresponding to the charge potential of condenser 53 and remains at the latter point, indicating altitude of the aircraft in the given interference pattern just passed through, and holding this indication until the condenser 53 is discharged.

To discharge the condenser 53 after the altitude has been read on instrument 52, and to maintain, between the periods when the instrument 52 is indicating altitude, a definite negative bias on control electrode 69 which would otherwise be floating and therefore would cause disturbance in the functioning of instrument 52 at the beginning of the next active period, a discharge switch 75 is connected between the control electrode end of condenser 53 and an intermediate point of a resistor 76 which is connected, across a portion of potentiometer 61, at one extremity to the cathode 72 and at the other extremity adjustably through a switch 77 to a point of lower potential on the potentiometer 61.

In order to adjust the altitude indicating apparatus to compensate, for example, for variations of the speed of the aircraft from predetermined normal speeds and thereby to permit the indicating instrument 52 to register altitude correctly at each succeeding beacon along a radio trail or a glide path, leak resistor 56 is made adjustable. If the speed of the aircraft as it enters the interference pattern of a given beacon is higher than normal for the given beacon, which would cause the pulse rate of the charging current for condenser 54 to be too high and the altitude instrument 52 to indicate an altitude lower than the actual altitude of the aircraft at that beacon, the resistor 56 is so adjusted that the resistance across condenser 54 is decreased, thereby increasing the leakage through resistor 56 and correspondingly increasing the time constant of the peak charge on condenser 54. This preliminary adjustment of resistor 56 is such that as the aircraft then passes through the given pattern at the higher than normal speed, the increased leakage through the resistor compensates for the increased pulse rate of the charging current for condenser 54. Condenser 53 therefore registers the peak voltage corresponding to normal speed and altitude instrument 52 indicates the altitude of the aircraft for the given beacon correctly, after the aircraft has passed through the interference pattern.

If, however, the speed of the aircraft is lower than normal as it enters the interference pattern of the given beacon, the adjustment for this lower than normal speed is made by adjusting resistor 56 to increase the resistance across condenser 54, thereby correspondingly decreasing the time constant of the peak charge on condenser 54. The decreased leakage through resistor 56 then compensates for the decreased pulse rate of the charging current. Condenser 53 therefore again registers the peak voltage of condenser 54 corresponding to normal speed and instrument 52 indicates the altitude correctly.

Because of the relatively large difference in the pulse rate of the charging current for condenser 54 in flying at high altitudes, as in cross-country flying, and at low altitudes as in landing, the indication of altitude on a single scale is difficult. It is preferable, therefore, to provide in instrument 52 a "navigation" or high altitude scale and a "landing" or low altitude scale. For the "navigation" or high altitude scale, since the pulse rate of charging current for condenser 54 is relatively low at high altitude, because at this altitude the spacing between maxima in the fan shaped interference patterns is relatively wide, resistor 56 is so adjusted that the leak resistance across condenser 54 is relatively high and the navigation scale is calibrated for ready indication of the high altitudes. On such a scale the low altitude indicia because of the high pulse rate of charging current for condenser 53 due to the narrow spacing between interference pattern maxima, would be crowded far down to the bottom of the scale. Therefore, for the "landing" or low altitude scale the resistor 56 is so adjusted that the leak resistance across condenser 53 is low relatively to the resistance employed in connection with the navigation scale, and the landing scale is suitably calibrated for the low altitudes.

As hereinbefore mentioned, the altitude signal transmitters along the glide path at a landing field may be so spaced and may set up interference patterns of such form that, at the decreasing predetermined speeds of the aircraft through the successive interference patterns, the pulsation frequency at the glide path will not be the same at the successive stations, being, for example, the least at the first beacon and progressively increasing to the last. If a single scale is employed in instrument 52 to indicate the altitude down such a glide path, compensation for the changing pulse rate is required, and is obtained, in the manner above explained, by suitable adjustment of the resistor 56 which regulates the rate of leakage of the charging current for condenser 54.

In describing the operation of the present invention in guiding an aircraft through fog over a cross-country radio trail and down glide paths to landing fields located along the radio trail, let it be assumed that the pilot, flying on the radio trail at an altitude, for example, of 5,000 feet above ground, encounters fog and thereupon prepares for the guiding of the craft by the radio signals from the radio trail or course beacons or stations. The cross-country radio trail stations may be spaced about ten miles apart and all or most of them may be located at points where an aircraft light beacon already exists, although the light signals are not visible in fog. The pilot's first concern is to follow this cross-country radio trail, which may, for example, be a winding path through mountain passes. For this purpose he tunes in his radio receiver 46 on the frequency of the course and altitude signal transmitters and observes the visual course indicator 50. Tube 49 of receiver 46 is so biased by connection of its control electrode to potentiometer 51 that in the absence of the dot-dash modulation of the course signal the impressing of this signal on the tube would result in a non-pulsating output current whose amplitude, indicated by the moving of the pointer of instrument 50 toward the right of the dial, increases as the distance of the plane from the transmitting station which the plane is approaching decreases. When, however, the course signal is dot-dash modulated as hereinbefore described, assuming, first, that the plane is directly on the proper course, the dot signals radiated by antenna 23 and dash signals radiated by antenna 24 are equal in magnitude at a given time period. Therefore, under these on-course conditions, since the signals impressed by the two antennas 23 and 24 on tube 49 are of equal magnitude, the output current of tube 49 is practically steady, or non-pulsating, and the pointer of instrument 50 merely moves steadily to the right as the distance between the plane and the station decreases.

Assuming, second, that the plane is, at a given time, to the right of the proper course, as at point $p_1$ of Fig. 2, then the strength of the signal received from antenna 24 will be greater than the signal strength for the on-course condition and the strength of signal received from antenna 23 will be less than for the on-course condition. Therefore, at this given time the position of instrument 50 indicates a relatively steady current, slightly higher than for the on-course condition, due to the dash signals from antenna 24, and the pointer periodically shifts or "kicks" to the left to indicate the periodically recurring lower signal current pulses due to the dot signals from antenna 23.

Assuming, third, that the plane is, at a given time, to the left of the proper course, as at point $p_2$. In this latter case the strength of the signal received from antenna 23 will be greater and from antenna 24 less than for the on-course signal. Therefore, the pointer of instrument 50 indicates in this third case a relatively steady current, due to the dash signals from antenna 24, which is slightly lower than for the on-course condition, and the pointer periodically shifts or "kick" to the right to indicate the periodically recurring higher signal current pulses due to the dot signals from antenna 23.

Therefore, if the pilot is to the right of the proper trail, the pointer of the course indicator 50 will make periodic motions or "kicks" to the left. If he is to the left of the proper trail the pointer of indicator 50 will make periodic motions or "kicks" in the other direction. By correcting his course in accordance with the readings of the course indicator 50 he will bring the plane directly on the trail, in which position the course indicator pointer remains substantially steady, the pointer merely moving across the dial to indicate change in distance between the plane and the transmitting station which the plane is approaching.

As the pilot then approaches this beacon or station on the radio trail, the received signal from the course signal antenna will become progressively stronger, this increase of course signal being indicated as above explained by the steady movement of the pointer of course indicating instrument 50 to the right.

The trail as indicated by the pilot's chart may change direction at this next station and it is, therefore, desirable that he should be able to identify this station. He may conveniently receive this information while he is approaching and before he arrives at the station, by a code signal which is given him from time to time. This code signal may be supplied from the course signal transmitting system by any suitable keying means, be associated with the transmitter 27, and the code signal may be observed on the course indicator 50.

Before entering the interference pattern set up by the altitude radiation from the altitude transmitter unit of the radio trail station which he is now approaching as shown by the stronger signal indications in course indicator 50, the pilot will adjust the altitude indicating system, at resistor 56, for the use of the "navigation" scale of altitude indicating instrument 52. Just before entering the interference pattern he makes, at resistor 56, an adjustment of the altitude indicating system if necessary, to compensate for a speed of the aircraft, as indicated by the air speed indicator, which may be different from the predetermined trail speed, in order that the altitude indicating system may be in readiness to indicate altitude more nearly correctly. He also opens the normally closed short circuiting switch 75 for condenser 53 in order that altitude indicator 52 may be in readiness to function. As the aircraft now passes through the interference pattern set up by the two altitude signal transmitters at the station, the pointer 73 of altitude instrument 52 moves downward from its extreme upper position first fast and then slowly, and finally stops. The pointer 73 remains in its lowest position, as the aircraft leaves the interference pattern. Altitude is thus indicated to the pilot by the point of the dial at which pointer 73 stops.

In addition to making an adjustment of the altitude indicating apparatus in accordance with the aircraft speed as indicated by the air speed indicator, the pilot should, furthermore, make an adjustment of the altitude indicating apparatus to compensate for the wind velocity, since the altitude instrument responds to the pulsation frequency due to the passing of the aircraft through the fixed interference pattern, and therefore to the ground speed of the aircraft. If the pilot does not know the wind velocity he can, however, utilize the altitude indicating system on the aircraft to ascertain the velocity. For this purpose he flies over the train station first in one direction and then in the opposite direction at the same barometric altitude. If, for example, he measures 5000 feet in one direction and 6000 feet in the other direction he concludes that the true altitude was 5500 feet and that the wind velocity was 10 per cent of his flying speed.

The altitude indicating system having been adjusted for speed variation and for wind velocity, in the trail direction as above described, correction of the altitude of the aircraft can then be made if necessary as the craft proceeds toward the succeeeding station. After the altitude at the station just passed through has been noted and altitude correction made if required, the short circuiting switch for condenser 53 is again closed to reset altitude indicator 52 to the off point, and the pilot continues on the radio trail, guided by the indications of the course indicator 50. The altitude of the aircraft is determined as above described, and corrected if necessary, at each of the succeeding stations passed through by the aircraft in flying cross-country along the radio trail.

Thus it will be seen that the pilot is able to navigate the aircraft on the cross-country radio trail with accuracy and with confidence, without seeing the ground, and without it being necessary for him to reduce his altitude above ground until he approaches a landing field.

Assuming that it is his intention to land the aircraft at the field, he begins at a suitable point along the trail to descend gradually from the trail altitude, assumed to be 5000 ft., to a lower altitude, for example 1000 ft., and while doing so he changes the adjustment of the altitude indicating system from the scale labeled "navigation" to the scale labeled "landing." Instead of so arranging the transmitter stations that the pilot begins to descend the landing station glide path as soon as the aircraft has reached the 1000 foot level after descending from the 5000 foot level, it is preferable that the craft first pass over, at the 1000 foot altitude, a series of course and altitude signal stations or beacons which may be called "landing" beacons. These are of the same type as the cross-country radio trail stations or beacons but are spaced for some distance at substantially shorter intervals than the cross-country trail beacons. The pilot verifies and corrects, if necessary, his course and altitude as he passes these landing beacons. When he arrives within a suitable distance, for example two miles, of the landing field, he starts his landing glide down the glide path.

Figure 1A:
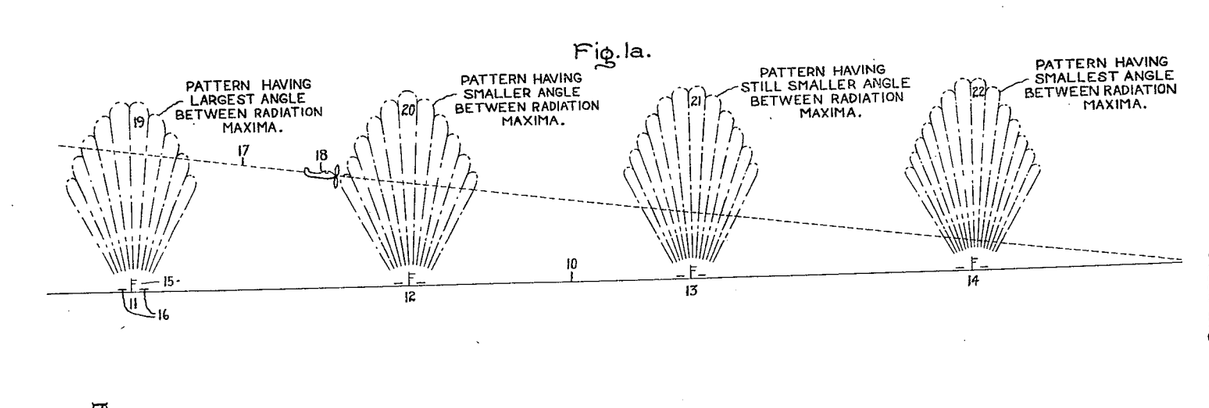
Fig. 1a shows a modification in which the interference patterns are so arranged that at predetermined decreasing speeds of the plane down the glide path the frequency of the received pulses is the same at all of the patterns.

A suitable number of beacons may be located along the glide path, for example four beacons corresponding respectively to glide path altitudes from 1000 feet at the first down to 200 feet at the last of the series. Let it be assumed as hereinbefore mentioned that the glide path beacons are so spaced, for example 2000 feet apart, and the several interference patterns from the first to the last along the glide path are of such different form as illustrated in general, for example in Fig. 1a, that at the correct predetermined decreasing speeds of the aircraft down the glide path the successive maxima of radiation from the glide path altitude signal transmitters are passed by the aircraft at constant intervals of time. In Fig. 1a, assuming that it is desired that the airplane speed decrease from a predetermined relatively high value at pattern 19 through predetermined lower values at patterns 20 and 21 to a predetermined value, at pattern 22, relatively low as compared with the high value at pattern 19, then the patterns are so spaced (equally in the present case), and are respectively of such form, that the intervals between the maxima of radiation along the glide path decrease in length approximately directly as the predetermined speeds from the pattern 19 to the pattern 22. In this case if, upon descending past the several beacons of the glide path, the pilot notes that the pointer of the altitude indicator 52 has stopped each time at the same predetermined point of the dial, for example the middle point, he then knows that the aircraft was at the predetermined correct altitudes for the several beacons, provided that the speed of the aircraft was the correct predetermined speed at each beacon. If he finds that the speed is not correct before entering any one of the several interference patterns, the pilot makes compensating adjustment at resistor 56, as hereinbefore explained. If the instrument 52 indicates, after the aircraft passes a glide path beacon, that the altitude was not correct for that beacon, the pilot changes his rate of descent correspondingly before the aircraft enters the interference pattern of the next succeeeding glide path beacon. After passing a beacon of the glide path, and verifying the altitude, the pilot returns the altitude indicator 52 to the off point by closing switch 75, and in the intervals between beacons he corrects his course, if necessary, by the indications of the course indicator 50. After leaving the last glide path beacon of the series, the aircraft glides to a landing.

In case the altitude signal transmitters along the glide path are so arranged that the interference patterns are all alike, the operation of gliding down the glide path to a landing is the same as just described except that, whether the altitude indicating apparatus be arranged to bring the pointer of indicator 52 to one predetermined point for each beacon as in the case just described, or on the other hand be arranged to show on one scale the altitude at each beacon in meters or feet, compensation for the increasing rate of pulsation of the charging current into condenser 54 during the descent of the aircraft down the glide path is required as the aircraft enters each one of the series of interference patterns. If, however, the hereinbefore mentioned multiple scale dial for altitude indicator 52 is employed, having a plurality of scales calibrated respectively to indicate altitude in meters or feet at the successive beacons of the glide path, the operation of gliding down the glide path to a landing will be as above described for the single scale indicator system showing actual altitude in meters or feet, except that in the case of the multiple scale system, no compensation for the increasing pulse rate of the charging current for condenser 54 is made by the pilot.

My invention has been described herein in particular embodiments for purposes of illustration. It is to be understood, however, that the invention is susceptible of various changes and modifications and that by the appended claims I intend to cover any such modifications as fall within the true spirit and scope of my invention.

What I claim as new and desire to secure by Letters Patent of the United States, is:

1. In a system for guiding an aircraft along a predetermined course comprising a transmitter apparatus located on said course including means for producing altitude signal radiation and for producing in said radiation an interference pattern which is fan-shaped in the direction of said course, a receiving system arranged on the craft to receive impulses due to the successive radiation maxima in said interference patterns as the craft traverses said radiation, and means to integrate said impulses and to indicate altitude of said craft from said integrated impulses comprising a condenser, means to charge said condenser to a peak potential corresponding to the frequency of said radiation maxima received by said aircraft at a given altitude thereof, a second condenser, means to charge said second named condenser from said first-named condenser to said peak potential, means to maintain said second-named condenser at said peak potential, and means for indicating the altitude of said aircraft in accordance with the charge on said second-named condenser.

2. In a system for guiding an aircraft comprising a transmitter apparatus for producing altitude signal radiation and for producing an interference pattern therein which is fan-shaped longitudinally of the predetermined course of said aircraft, signal impulse integrating and altitude indicating means on said aircraft responsive to said radiation comprising a condenser, means to charge said condenser to a peak potential corresponding to the frequency of said radiation received by said aircraft at a given altitude thereof, a second condenser, means to charge said second-named condenser from said first-named condenser to said peak potential, means to maintain said second-named condenser at said peak potential, and means to indicate the altitude of said aircraft in accordance with the charge on said second-named condenser.

3. In a system for guiding an aircraft along a course comprising signal transmitting means on said course, signal receiving means on said aircraft, said receiving means being adapted to receive from said signal transmitting means periodic potentials varying in frequency inversely as the altitude of said aircraft, means connected with said receiving means to integrate said periodic potentials and to indicate altitudes of said craft from said integrated potentials comprising a condenser, means to charge said condenser to a peak potential corresponding to the frequency of said potentials received by said aircraft at a given altitude thereof, a second condenser, means to charge said second-named condenser from said first-named condenser to said peak potential, means to maintain said second-named condenser at said peak potential, and means to indicate the altitude of said aircraft in accordance with the charge on said second-named condenser.

4. The combination, in a system for guiding an aircraft along a course at a predetermined speed, of a transmitting apparatus on said course for producing altitude signal radiation and for producing an interference pattern therein which is fan-shaped longitudinally of said course, and means for indicating altitude of said aircraft as said aircraft passes through said pattern at a predetermined speed, said means comprising a condenser, means to charge said condenser to a peak potential corresponding to the frequency of the radiation maxima of said pattern at the altitude level thereof at which said aircraft passes therethrough at said predetermined speed, a second condenser, means to charge said second-named condenser to said peak potential from said first-named condenser, means to maintain said second-named condenser at said peak potential, and means to indicate the altitude of said aircraft in accordance with the charge on said second-named condenser.

5. The combination, in a system for guiding an aircraft along a course at a predetermined speed, of a transmitting apparatus on said course for producing altitude signal radiation and for producing an interference pattern therein which is fan-shaped longitudinally on said course, and means to indicate for a desired period after passage of said aircraft through said pattern the altitude at which said aircraft passed therethrough, said means including a condenser adapted to receive charging current only during said passage of said aircraft and to be charged to a peak potential corresponding to the frequency of the radiation maxima of said pattern, a second condenser adapted to be charged from said first-named condenser to said peak potential during said passage, and means connected in series with said condensers to prevent leakage of the charge on said second condenser after said passage whereby said second condenser remains operative for indicating altitude after said passage of said aircraft through said pattern.

6. In a system for guiding an aircraft down a predetermined glide path to a landing field, a plurality of transmitter stations spaced at predetermined intervals below said glide path and in the vertical plane thereof, means at each station for producing a pair of course signal beams radiated respectively a predetermined number of degrees to right and left of said vertical plane, means at each station for producing altitude signal radiation directive in the direction of said vertical plane and for producing a predetermined interference pattern in said radiation, a single receiver unit on said aircraft, means in said unit to indicate the altitude of said aircraft responsive to periodic potentials impressed upon said unit due to the passing of said aircraft through said pattern, means in said unit responsive to said course signal beams to indicate the course of said aircraft and to indicate the approach thereof to a succeeding one of said transmitter stations, and means in said unit to transmit said periodic potentials through said course signal indicating means.

7. In a system for guiding an aircraft from a point on a cross-country trail down a glide path to a landing field, a plurality of transmitter stations spaced at relatively wide intervals along said trail and at relatively short intervals along said glide path, means at each station for producing a pair of course signal beams directed horizontally with vertical polarization and radiated respectively a predetermined number of degrees to right and left of the predetermined course of said aircraft, means at each station for producing altitude signal radiation highly directive in the direction of said course and so arranged as to produce a predetermined interference pattern in said altitude signal radiation, a single receiver unit on said aircraft, means in said unit to indicate the altitude of said aircraft responsive to periodic potentials impressed thereon when said aircraft passes through said pattern, means in said unit responsive to said course signal beams to indicate the course of said aircraft and to indicate the approach of said aircraft to a succeeding one of said stations, and means in said unit to transmit said periodic potentials through said course signal indicating means.

8. In a system for guiding an aircraft from a point on a cross-country trail down a glide path to a landing field, a plurality of transmitter stations spaced along said trail and said glide path, a course signal means at each station including a pair of antennas for producing a pair of beams directed horizontally with vertical polarization and radiated respectively substantially seventeen degrees to right and left of the predetermined course of said aircraft, means at each station including a pair of antennas spaced longitudinally of the predetermined course of said aircraft for producing altitude signal radiation highly directive in the direction of said course and for producing a fan-shaped interference pattern in said radiation, a single receiver unit on said aircraft, means in said unit to indicate the altitude of said aircraft responsive to periodic potentials impressed upon said unit when said aircraft passes through said pattern, means in said unit responsive to said course signal beams to indicate the course of said aircraft and to indicate the approach thereof to a succeeding one of said transmitter stations, and means in said unit to transmit said periodic potentials through said course signal indicating means.

9. In a system for guiding an aircraft down a predetermined glide path to a landing field at a speed decreasing at a predetermined rate, a plurality of altitude signal transmitting stations spaced at predetermined intervals along said glide path, pulse receiving means on said aircraft, and a plurality of fan-shaped interference patterns produced by said stations respectively to cause pulses of approximately the same frequency to be impressed on said receiving means as said aircraft passes through all of said patterns along said predetermined glide path and at said speed decreasing at a predetermined rate.

10. In combination, in a system for guiding an aircraft down a predetermined glide path to a landing field at a speed decreasing at a predetermined rate, a series of altitude signal transmitting stations spaced at predetermined intervals along said glide path for producing identical interference patterns intersected by said glide path, altitude signal receiving means on said aircraft including altitude indicating means responsive to the successive radiation maxima in said patterns, and means to adjust said altitude indicating means to compensate for the variation in frequency of said radiation maxima as said aircraft passes through said patterns.

11. In a system for guiding an aircraft along a course comprising signal transmitter means on said course, altitude signal receiving means on said aircraft including a condenser and a leak resistor in parallel therewith, said signal transmitting means being adapted to impress on said receiving means periodic potentials varying in frequency inversely as the altitude of said aircraft, means for supplying current pulses to said condenser in accordance with said potentials, a second condenser, means for charging said second condenser to the peak potential of said first-named condenser and for maintaining said second-named condenser for a desired period at said peak potential, and means for indicating altitude of said aircraft in accordance with the charge on said second-named condenser.

12. In a system for guiding an aircraft along a course comprising signal transmitting means on said course, altitude signal receiving means on said aircraft including a condenser and a leak resistor in parallel therewith, said signal transmitting means being adapted to impress on said receiving means periodic potentials varying in frequency inversely as the altitude of said aircraft, means for supplying current pulses to said condenser in accordance with said potentials, a second condenser, means for charging said second condenser to the peak potential of said first-named condenser and for maintaining said second-named condenser at said peak potential, means for indicating altitude of said aircraft in accordance with the charge on said second-named condenser, said last-named means including a space discharge device having a control electrode adapted to have a potential impressed thereon from said second-named condenser, and means to discharge said second-named condenser and to impress a negative bias potential upon said control electrode.

13. In a system for guiding an aircraft along a course comprising signal transmitting means on said course, altitude signal receiving means on said aircraft including a condenser and a leak resistor in parallel therewith, said signal transmitting means being adapted to impress on said receiving means periodic potentials varying in frequency inversely as the altitude of said aircraft, means for supplying current pulses to said condenser in accordance with said potentials to charge said condenser to a peak potential corresponding to the frequency of said periodic potentials received by said aircraft at a given altitude thereof, a rectifier, a second condenser, means for connecting said second condenser through said rectifier across said first-named condenser to receive a charge at said peak potential therefrom, and means for indicating altitude of said aircraft in accordance with the charge on said second condenser.

14. The combination, in a system for guiding an aircraft down a predetermined glide path to a landing field, of altitude signal receiving means on said aircraft including a condenser and a leak resistor in parallel therewith, a series of signal transmitting stations spaced along said path for impressing on said receiving means periodic potentials as said aircraft passes said stations successively, means for supplying current pulses to said condenser in accordance with said potentials, means for indicating altitude of said aircraft at each of said stations in accordance with the peak charge on said condenser, the leak resistance supplied across said condenser by said resistor being adapted to be increased progressively as said aircraft passes said stations successively, thereby to compensate said indicating means for said progressive increase in frequency of said potentials.

15. The combination, in a system for guiding an aircraft along a course, of a single receiver unit on said aircraft for receiving course signals and altitude signals, a series of signal transmitting stations on said course each including transmitting means for impressing course signals on said receiver unit when said aircraft is passing from one station to the next in the series and altitude signal transmitting means for impressing periodic potentials on said receiver unit when said aircraft is approaching and passing over any one of said stations, means in said receiver unit for indicating altitude of said aircraft in response to said periodic potentials, means in said receiver unit for indicating the course of said aircraft in response to said course signals, and means to transmit said periodic potentials through said course signal indicating means.

16. In a system for guiding an aircraft down a predetermined glide path to a landing field comprising an altitude signal transmitting station for producing a fan-shaped interference pattern intersected by said glide path, altitude signal receiving means on said aircraft including altitude indicating means responsive to the successive radiation maxima in said pattern and adapted to indicate a predetermined altitude of said aircraft at said station and at a predetermined speed of said aircraft when passing said station, said altitude indicating means comprising a condenser, means to charge said condenser to a peak potential corresponding to the frequency of said maxima received by said aircraft at a given altitude thereof, a second condenser, means to charge said second-named condenser to said peak potential from said first-named condenser, means to maintain said second-named condenser at said peak potential, means to indicate said altitude of said aircraft in accordance with the charge on said second-named condenser, and a resistor connected across said first-named condenser and adapted to be varied thereby to adjust said altitude indicating means to compensate for variation of the speed of said aircraft from said predetermined speed.

17. In a system for guiding an aircraft along a course comprising altitude signal transmitting means on said course, altitude signal receiving means on said aircraft including a condenser and a leak resistor in parallel therewith, said signal transmitting means being adapted to impress on said receiving means periodic potentials varying in frequency inversely as the altitude of said aircraft, means for supplying current pulses to said condenser in accordance with said potentials, a second condenser, means for charging said second-named condenser from said first-named condenser to the peak potential of said first-named condenser, means comprising a rectifier connected in series with said condenser to maintain said second-named condenser at said peak potential, and means for indicating altitude of said aircraft in accordance with the charge on said second-named condenser due to said current pulses.

18. In a system for guiding an aircraft along a course comprising a signal transmitting means on said course, altitude signal receiving means on said aircraft including a condenser and a leak resistor in parallel therewith, said signal transmitting means being adapted to impress on said receiving means periodic potentials varying in frequency inversely as the altitude of said aircraft, means for supplying current pulses to said condenser in accordance with said potentials, means for indicating altitude of said aircraft in accordance with the peak potential on said condenser, said indicating means comprising a second condenser, means to charge said second-named condenser to said peak potential from said first-named condenser, means to maintain said second-named condenser at said peak potential, and means to indicate altitude of said aircraft in accordance with the charge on said second-named condenser, the leak resistance provided by said resistor being adapted to be varied thereby to vary the time constant of the peak charge on said first-named condenser.

19. In a system for guiding an aircraft along a course comprising a signal transmitting station on said course, altitude signal receiving means on said aircraft including a condenser and a leak resistor in parallel therewith, said signal transmitting means being adapted to impress on said receiving means periodic potentials varying in frequency inversely as the altitude of said aircraft and directly as the speed thereof in passing over said station, means for supplying current pulses to said condenser in accordance with said potentials, means for indicating altitude of said aircraft in accordance with the peak potential on said condenser due to said current pulses, said indicating means comprising a second condenser, means to charge said second-named condenser to said peak potential from said first-named condenser, means to maintain said second-named condenser at said peak potential, and means to indicate the altitude of said aircraft in accordance with the charge on said second-named condenser, the leak resistance supplied across said first-named condenser by said resistor being adapted to be varied thereby to compensate said indicating means for variation of the speed of said aircraft from a predetermined speed as it passes over said station.

ERNST F. W. ALEXANDERSON.